(12) United States Patent
Wachel

(10) Patent No.: US 7,068,119 B2
(45) Date of Patent: Jun. 27, 2006

(54) FIXED IMPEDANCE SHIELDED DIFFERENTIAL PAIR WITH PAIRS OF SIDE GROUND PLANE VIAS

(75) Inventor: Robert D. Wachel, Altadena, CA (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 10/705,777

(22) Filed: Nov. 10, 2003

(65) Prior Publication Data

US 2004/0148448 A1 Jul. 29, 2004

Related U.S. Application Data

(62) Division of application No. 09/676,173, filed on Sep. 29, 2000, now Pat. No. 6,675,254.

(51) Int. Cl.
*H01P 3/02* (2006.01)

(52) U.S. Cl. .............................................. 333/4; 333/5

(58) Field of Classification Search ................ 333/1, 333/4, 5, 238
See application file for complete search history.

(56) References Cited

U.S. PATENT DOCUMENTS

| | | | | |
|---|---|---|---|---|
| 2,034,034 | A | * | 3/1936 | Green et al. ................... 333/4 |
| 3,146,403 | A | * | 8/1964 | Bobisch et al. .............. 330/4.6 |
| 4,605,915 | A | * | 8/1986 | Marshall et al. ............ 333/238 |
| 5,161,156 | A | | 11/1992 | Baum et al. .................... 371/7 |
| 5,978,881 | A | | 11/1999 | Lebhar ........................ 710/131 |
| 6,105,122 | A | | 8/2000 | Muller et al. ................... 712/1 |
| 6,112,271 | A | | 8/2000 | Lanus et al. ................. 710/128 |
| 6,134,589 | A | | 10/2000 | Hultgren ..................... 709/227 |
| 6,247,077 | B1 | | 6/2001 | Muller et al. .................. 710/74 |
| 6,456,498 | B1 | | 9/2002 | Larson et al. ................ 361/752 |
| 6,473,827 | B1 | | 10/2002 | McMillen et al. ........... 710/316 |
| 2001/0036178 | A1 | | 11/2001 | Savory ........................ 370/364 |

* cited by examiner

*Primary Examiner*—Benny Lee
(74) *Attorney, Agent, or Firm*—Grossman, Tucker, Perreault & Pfleger, PLLC

(57) ABSTRACT

A system and method for transferring information at a fast rate between add-in cards in a rack mount system are described. In one embodiment, the invention allow all the add-in cards within the rack mount system to be interconnected. All the main cards within the rack mount system connect to a switch card using point-to-point differential copper pairs. All communication over these differential copper pairs use a messaging protocol that provides a messaging protocol destination address that is used to route the information to the intended destination main card. The messaging protocol may be the Ethernet protocol. In an alternative embodiment, data redundancy is provided by having two switch cards in the rack mount system. A particular main card transmits one set of information to the first switch card and a second set of information (that is identical to the first set of information) to the second switch card. The first switch card routes the first set of information to a particular one of the main card that is the intended destination and the second switch card routes the second set of information to the destination main card (i.e., the first switch card and the second switch card transfer the first set of information and the second set of information to the same destination main card). The destination main card uses the information that is first-to-arrive but if the information that is first-to-arrive has an error, then the later-to-arrive information is selected for use. The point-to-point differential copper pairs between the main cards and the one or more switch cards are referred to as a switched Ethernet interconnect. The switched Ethernet interconnect may be integrated within the mid-plane or using external cables.

8 Claims, 15 Drawing Sheets

Rack Mount System
100

Rack Mount System
100

Rack Mount System
100

Front Side Add-In Card
203

Switch Card
116a

J3 Connector
212

J3 Connector
212

FIXED IMPEDANCE SHIELDED DIFFERENTIAL PAIR WITH PAIRS OF SIDE GROUND PLANE VIAS

This application is a Divisional of patent application Ser. No. 09/676,173, filed on Sep. 29, 2000.

BACKGROUND OF THE INVENTION

I. Field of the Invention

This invention relates generally to communication technology, and more particularly, to improving information transfer rates among all the cards in a rack mount system.

II. Background Information

Data processing systems typically experience data bottlenecks using busses such as those defined by the Industry Standard Architecture ("ISA"), the Extended Industry Standard Architecture ("EISA"), and the peripheral component interconnect ("PCI"). The PCI standard is a bus standard developed for personal computers ("PCs") by the Intel Corporation that can transfer data between the CPU and card peripherals at much faster rates than possible via the ISA bus. The mechanical, electrical, and operation characteristics for the current PCI bus standard may be found in PCI Local Bus Specification, Revision 2.1, available from the PCI Special Interest Group.

PCI was originally designed for standardizing the interfaces available on chips to be used on PC compatible peripherals and was unique in that it utilized silicon. The PCI bus specification provided a processor-independent interface to add-in cards, also commonly referred to as expansion cards or adapters. Because of AC switching characteristic limitations, the PCI bus is typically limited in both information transfer rate and fan-out (number of add-in cards supported). The information transfer rate and fan-out in the PCI bus are interdependent, such that achieving an increase in one generally results in a decrease in the other.

Despite becoming the established interface, offering relatively high-speed data transfer, PCI lacked the higher density available from systems utilizing VersaModule Europe ("VME"), as only four cards could be supported within a system. CompactPCI was a solution to this set of problems, given that it adopted the proven European form factor successfully utilized in VME systems.

CompactPCI is an adaptation of the PCI Specification 2.1 or later for industrial and/or embedded applications requiring a more robust mechanical form factor than desktop PCI. CompactPCI provides a system that is electrically compatible with the PCI Specification, allowing low cost PCI components to be utilized in a mechanical form factor suited for rugged environments. The mechanical, electrical, and operation characteristics for the current CompactPCI standard may be found in the CompactPCI Specification, PICMG 2.0 R3.0, available from the PCI Industrial Computer Manufacturers Group ("PICMG").

Unlike its desktop cousin, the CompactPCI comes in a rugged 3U (100 by 160 mm) or 6U (233 by 160 mm) VME packaging and uses a high quality 2 mm metric pin and socket connector that can be front loaded into a rack mount system. The CompactPCI has a 32 or 64-bit synchronous data bus, 32 bit address bus, 133 or 266 Mbytes/s data transfer rate, multiprocessing, and up to eight slot backplanes for add-in cards (the eight add-in cards interconnected together are known as a bus segment). Because of its extremely high bandwidth, the CompactPCI bus is particularly well suited for many high speed data communication applications such as switches. A hot swap feature is included in the CompactPCI specification which makes CompactPCI particularly well suited for the telecommunication industry.

Compared to the standard desktop PCI, Compact PCI supports twice as many PCI add-in cards (eight versus four) and offers a packaging scheme (i.e., the rack mount system) that is much better suited for use in industrial applications. The CompactPCI cards are designed for front loading and removal from a card cage within the rack mount system. The cards are firmly held in position by their connector, card guides on both sides, and a face plate which solidly screws into the card cage. Cards are mounted vertically allowing for natural forced air convection cooling.

A CompactPCI rack mount system (i.e., a system that includes add-in cards that conform to the CompactPCI form factor) supports the interconnection of CompactPCI form factor add-in cards within the system. The CompactPCI rack mount system may integrate a CompactPCI bus (i.e., a PCI bus integrated within the CompactPCI rack mount system). Information is transferred between the add-in cards connected to the CompactPCI bus at a rate of 1,056 MBit/s. The CompactPCI bus does not provide data redundancy, i.e., two sets of data is not transmitted to overcome errors in one of the sets of data.

The CompactPCI rack mount system may also integrate a H.110 TDM Telephony bus (the "H.110 bus"). The H.110 bus is known as the computer telephony specification or PICMG 2.5. The H.110 bus defines a single, industry-wide Computer Telephony Bus allowing the TDM interconnection of CompactPCI form factor telephony cards and peripherals within the rack mount system. The H.110 bus is not limited to only interconnecting a maximum of eight cards as is the case with the CompactPCI bus. The H.110 bus typically has a transfer rate of 256 MBit/s. In terms of switching bandwidth, the H.110 bus has a maximum capacity of 4096 bidirectional timeslots, each of the timeslots with a capacity 64 Kbit/s. However, if the peripheral card requires more timeslots than 4096 (e.g., cards supporting 3,072 simultaneous V.90 modems require 6,144 timeslots), then the H.110 bus is not adequate to support this bandwidth. As with the CompactPCI bus, the H.110 bus also does not provide data redundancy which is critical in some applications.

Deficiencies in the typical rack mount system may include the CompactPCI bus being slow (processes 1,056 MBit/s) for contemporary applications, and because of load considerations, the CompactPCI bus can only support up to eight cards (which is a relatively low fan-out) and does not provide data redundancy which may be critical for some applications. The H.110 TDM Telephony bus is also too slow (processes 256 MBit/s) thus not providing adequate bandwidth for contemporary applications and also does not provide data redundancy.

For the foregoing reasons, there is a need to connect cards in the rack mount system such that the connection is fast, supports a workable number of cards (i.e., has a high fan-out), and provides for data redundancy which is critical for some applications.

DETAILED DESCRIPTION

Figure 1A:
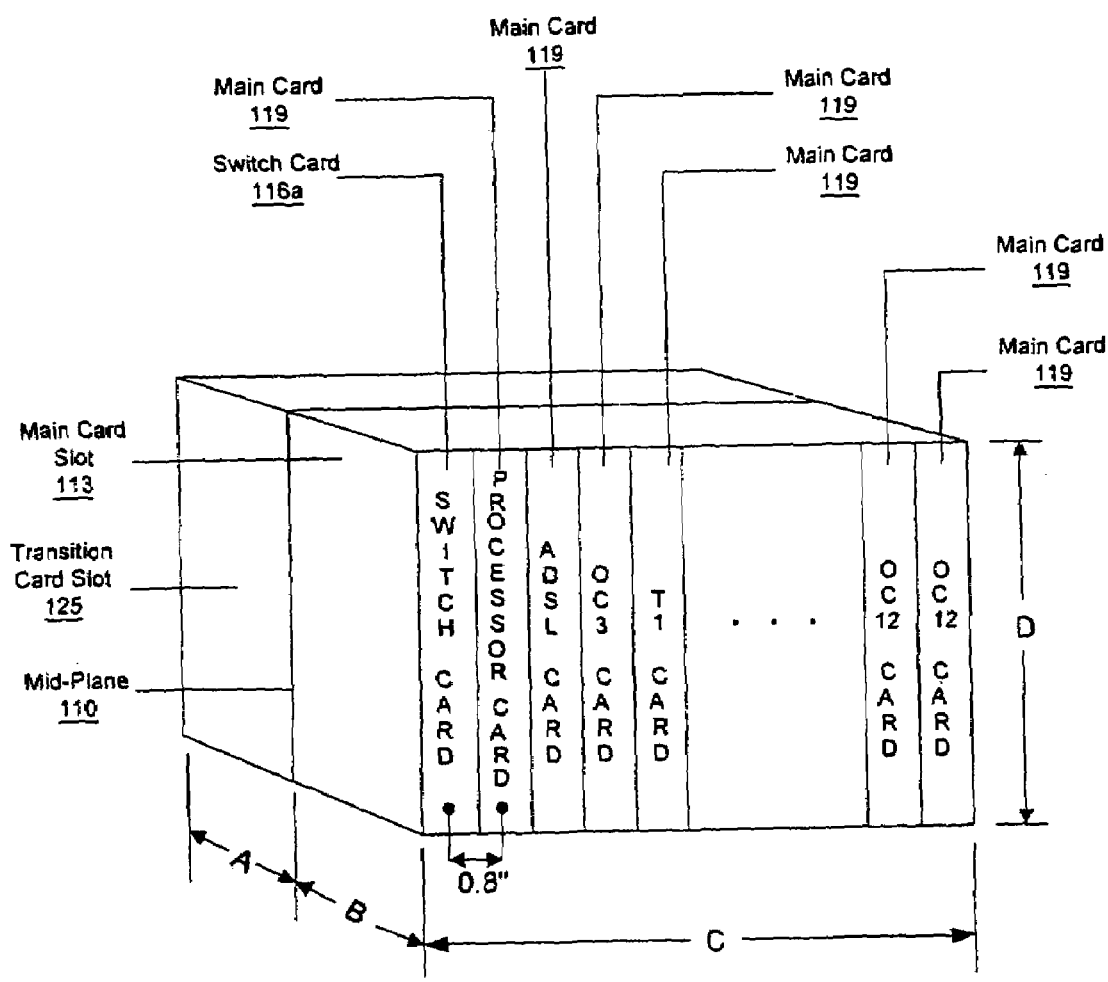
FIGS. 1a–1b show a first embodiment of a rack mount system according to the present invention.

Computer telephony integration encompasses an entire industry, devoted to the closer integration of telephony systems with computer-control devices, as well as an ever-expanding range of applications. At the forefront of this industry are innovative products, built using devices able to terminate digital telephony tier 1 ("T1") and European digital telephony tier 1 ("E1") trunk interfaces, fax and voice processing resources, voice-over-IP (VoIP) technology, and other standard peripheral devices. Typically, these devices operate in a rack mount system and act as switches, voice-mail servers, automatic call distributors, etc.

CompactPCI is a new standard for the rack mount system and the integration of add-in cards that combine the practicalities and real-world economics of the conventional PC world with the kind of features long-demanded by telephone companies. For the first time, computer telephony integrators can cheaply and efficiently build rugged, high-density systems with the added advantage of hot swappability.

Add-in cards are inserted into a rack mount system, which also hosts a processor. The add-in cards occupy slots on the backplane, derive their power from the rack mount system, and utilize the host processor to drive the applications associated with them. Information from one card may be transferred to another card within the rack mount system using a bus. The bus is a set of hardware lines ("conductors") used for information transfer among the cards in the rack mount system. Information may also be transferred using dedicated point-to-point serial communication links. Point-to-point links are communication links in which dedicated links exist between individual origins and destinations.

One application of the rack mount system is for computer telephony. In computer telephony systems terminating E1 or T1 physical interfaces, for example, a typical application may require that information be switched from inputs to selected outputs and such information may consist of telephone calls. Because each add-in card will terminate a finite number of such interfaces, larger systems can be designed by incorporating several of these add-in cards into vacant slots in the rack mount system and allowing signal transfer between cards using the bus. In this way, low-cost, PC based switches that terminate large numbers of E1s or T1s can be assembled.

A CompactPCI rack mount system is composed of one or more CompactPCI bus segments. Each segment is composed of up to eight CompactPCI boards with 0.8 inch center-to-center spacing. Each segment consists of one system slot and up to seven peripheral slots. The slots house add-in cards that are either 3U (100 mm by 160 mm) or 6U (233.5 mm by 160 mm). While the 3U card only has two connectors (i.e., J1 and J2 connectors) as described in the CompactPCI Specification, the 6U card has five connectors (i.e., J1 through J5 connectors) as also described in the CompactPCI Specification. In both the 3U and the 6U cards, the J1 connector is used for 32-bit PCI transfers and the J2 connector may be used for 64-bit PCI transfers.

One or more busses may be integrated into the Compact-PCI rack mount system. The busses may be, for example, the CompactPCI bus (the PICMG 2.0 R3.0 specifies the J1 and J2 connectors as implementing the CompactPCI bus) and the H.110 bus (the PICMG 2.5 defines the J5 connector as implementing the H.110 bus). These busses allow the various add-in cards inserted into the rack mount system to communicate with each other. Information transfer rates vary depending on the type of bus used. For example, the H.110 bus transfers information at 256 MBit/s and the CompactPCI bus transfers information at 1,056 MBit/s. These transfer rates are too slow for many contemporary applications such for telecommunications. Deficiencies in this system include the CompactPCI bus being too slow for contemporary applications (limited to processing 1,056 MBit/s), load limitation of supporting up to only eight cards, and failure to provide for data redundancy. The H.110 bus is also too slow for contemporary applications (limited to processing 256 MBit/s) and also does not provide for data redundancy.

Figure 1B:
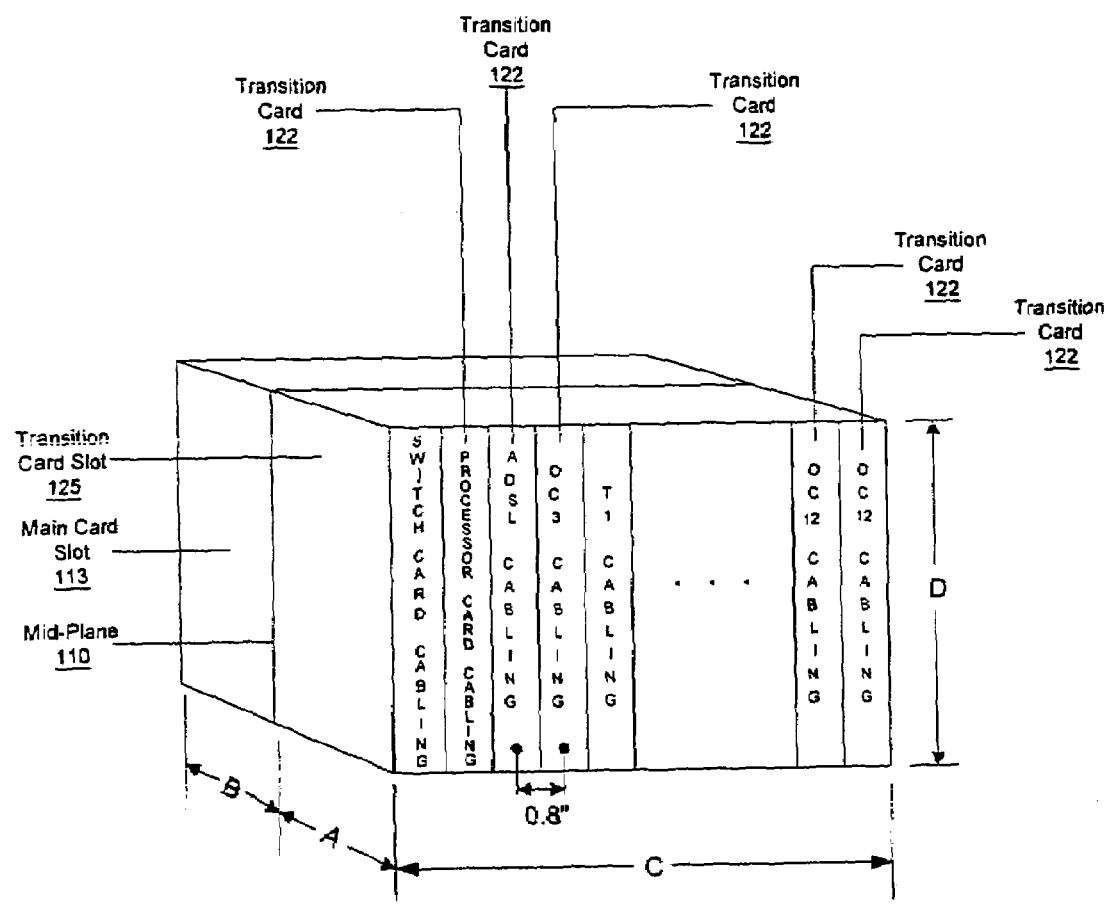

FIGS. 1*a*–1*b* show a first embodiment of a rack mount system 100 according to the present invention. According to this embodiment, rack mount system 100 is used to, among other functions, house and provide power to one or more add-in cards that allow, for example, the switching of multiple telephone calls. Rack mount system 100 includes a main card slot 113, a mid-plane 110, and a transition card slot 125. Add-in cards can be inserted from both the front and back of rack mount system 100. From the front, add-in cards are inserted into main card slot 113 of rack mount system 100. The add-in cards inserted from the front include one or more main cards 119 and switch card 116*a*. In this embodiment, main card slot 113 has a height D of 9.19 inches, a width C of 17.00 inches, and a depth B of 6.30 inches. From the back, add-in cards are inserted into transition card slot 125 of rack mount system 100. From the back, the add-in cards inserted are one or more transition cards 122. In this embodiment, transition card slot 125 has a depth A of 3.15 inches, a width C of 17.00 inches, and a height D of 9.19 inches. Mid-plane 110 connects main card slot 113 and transition card slot 125.

Mid-plane 110 may also integrate various busses such as the CompactPCI bus and the H.110 bus. In addition to using busses, however, in this embodiment, dedicated point-to-point serial communication links connect each of the main cards 119 to switch card 116*a*. In point-to-point communication links, dedicated links exist between individual origins and destinations (i.e., between main cards 119 and switch card 116*a*). In this embodiment, the dedicated point-to-point serial communication links are differential copper pairs. Differential copper pairs are signal lines that use two conductors per signal, and information is transferred by detecting with a polarity or a magnitude of a voltage difference between the two signal lines (as opposed to detecting a signal level with respect to ground in the case of a single conductor signal line). In this embodiment, the protocol used for communicating information between main cards 119 and switch card 116a is Ethernet (e.g., the IEEE 802.3u Standard, 1995). Ethernet is a messaging protocol used in a bus or star topology in which information is transmitted in variable-length frames containing delivery and control information and up to 1,500 bytes of information. In alternative embodiments, however, different protocols (other than Ethernet) may be used to transfer information and those different protocols include asynchronous transfer mode ("ATM"), datagrams, and Internet Protocol ("IP").

A switched Ethernet interconnect, as used herein, has a link, that includes two differential copper pairs (one differential copper pair for transmitting information and the other differential copper pair for receiving information), between each of the main cards and one or more switch cards and uses Ethernet as the messaging protocol. In this embodiment, the switched Ethernet interconnect connects all main cards 119 in rack mount system 100 to switch card 116a. The switched Ethernet interconnect transfers information between each of the main cards 119 and switch card 116a at the rate of 100 MBit/s. Main cards 119 and switch card 116a connect to the switched Ethernet interconnect using the J3 connector which is found on all the add-in cards that have the 6U form factor.

In this embodiment, the point-to-point differential copper pairs interconnecting main cards 119 and switch card 116a are integrated within mid-plane 110. In an alternative embodiment, the interconnection of main cards 119 and switch card 116a using point-to-point differential copper pairs occur using external cables. In this alternative embodiment, the physical connection of main cards 119 and switch card 116a to mid-plane 110 is extended to the corresponding transition cards 122 inserted into transition card slot 125 such that main cards 119 and switch card 116a are also connected to the transition cards 122. By connecting main cards 119 and switch card 116a to the corresponding transition cards 122 inserted into transition card slot 125, external cables connected to transition cards 122 can be used to interconnect main cards 119 and switch card 116a by providing point-to-point differential copper pairs between each of the main cards 119 and switch card 116a.

Main cards 119 may be peripherals that are placed into vacant slots on main card slot 113. Main cards 119 may be a processor card that drives and directs other cards in main card slot 113 to perform a particular function. Main cards 119 may also be peripheral cards that, for example, terminate T1 or E1 physical interfaces. Main cards 119 may be, among other devices, a processor card, a T1 card, an E1 card, an optical carrier 3 ("OC3") card, and an asymmetric digital subscriber line ("ADSL") card.

In this embodiment, main cards 119 conform to the 6U form factor. Here, main cards 119 are 9.19 inches high, 6.30 inches deep, and has a center-to-center spacing with adjacent add-in cards of 0.80 inches. Because rack mount system 100 is 17.00 inches wide and the main cards have center-to-center spacing of 0.80 inches, only twenty-one add-in cards can be physically placed into rack mount system 100. Main cards 119 are inserted into slots of main card slot 113. The slots may be numbered from one to twenty-one where the first slot is the left-most slot when facing main card slot 113 in FIG. 1a and the twenty-first slot is the right-most slot. Switch card 116a routes information (e.g., telephone calls, data, signals, etc.) between main cards 119 in main card slot 113. For example, information such as telephone calls can be switched from inputs to selected outputs. In this embodiment, each of the main cards are connected to switch card 116a using point-to-point differential copper links. Here, the messaging protocol, Ethernet, provides a messaging protocol destination address, i.e., the address of the particular one of the main cards 119 to which the information is destined. Information is transferred from one of the main cards 119 to switch card 116a and switch card 116a, using the messaging protocol destination address, routes the information to the appropriate one of the main cards 119 that is the intended destination. In alternative embodiments, the messaging protocol may be datagrams, Internet Protocol ("IP"), or asynchronous transfer mode ("ATM").

In this embodiment, switch card 116a has a bandwidth of 2.4 Gbit/s to ensure that it can adequately support the other twenty main cards in rack mount system 100. This bandwidth ensures that the point-to-point differential copper pair links between each of the main cards and switch card 116a can be maintained at 100 MBit/s, i.e., switch card 116a with a bandwidth of 2.4 Gbit/s can easily support twenty main cards in which the connections from each of the main cards to switch card 116a has a bandwidth of 100 MBit/s. Switch card 116a can be inserted into any of the twenty remaining slots available on rack mount system 100, i.e., it is not limited to being placed in either the left-most slot (slot one) or the right-most slot (slot twenty-one) of rack mount system 100.

Transition cards 122 are add-in cards that are connected into the reverse of the vertically oriented main cards 119. Transition cards 122 have a center-to-center spacing with adjacent transition cards of 0.80 inches. Transition cards 122 terminate external input and output interfaces. All processor activity may be concentrated on the main cards 119, allowing all cabling associated with a particular card to be plugged into the electrical interfaces of transition cards 122 at the rear of the system. For example, in FIG. 1a, if a particular one of the main cards 119 is a T1 card then in FIG. 1b, the particular one of the transition cards 122 that corresponds to the particular one of the main cards 119 includes the cables to terminate the T1s. Because it is divided into two parts—main cards 119 and transition cards 122, main cards 119, when it must be replaced, can simply be removed using the physical ejector levers provided without disturbing the cabling secured to transition cards 122.

Figure 2A:
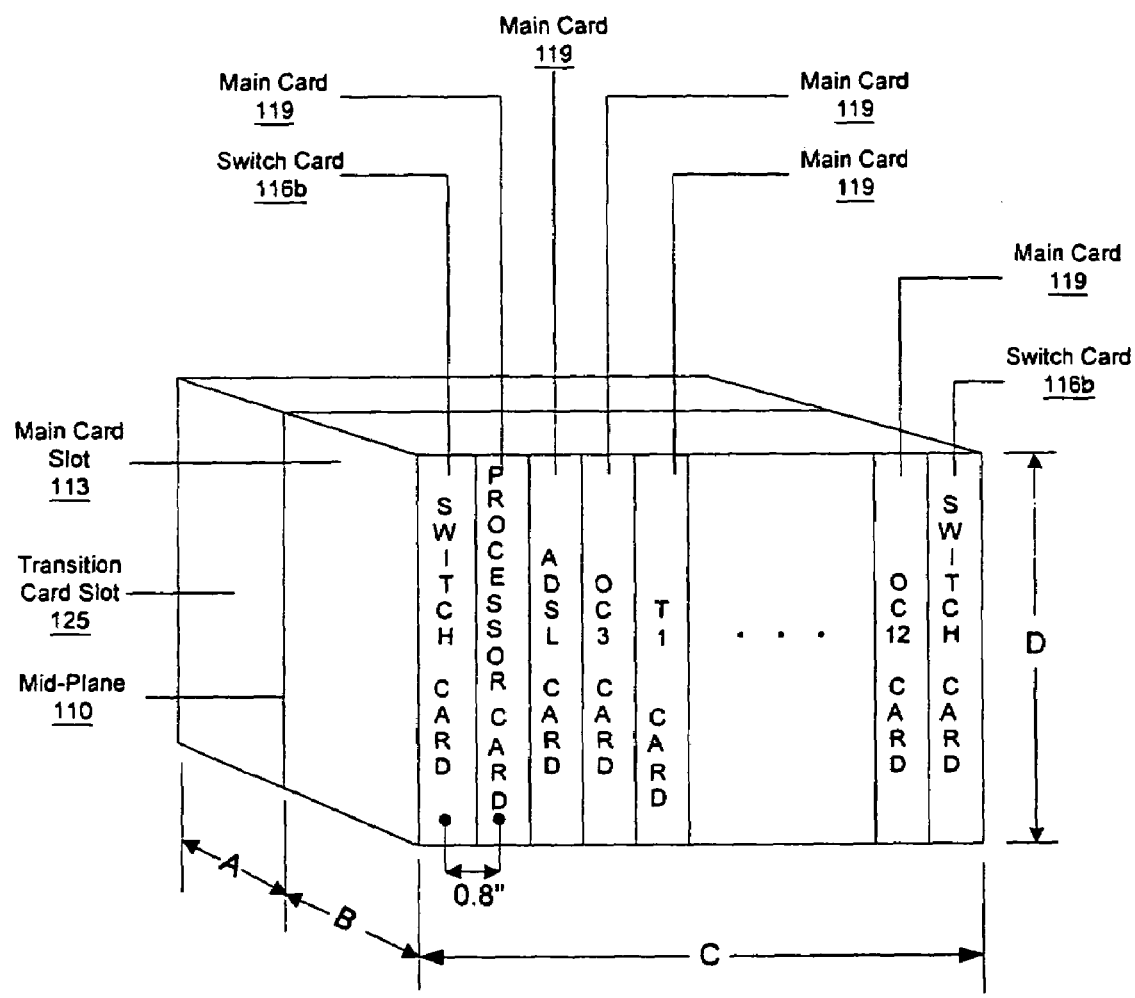
FIGS. 2a–2b show a second embodiment of the rack mount system according to the present invention.
Figure 2B:
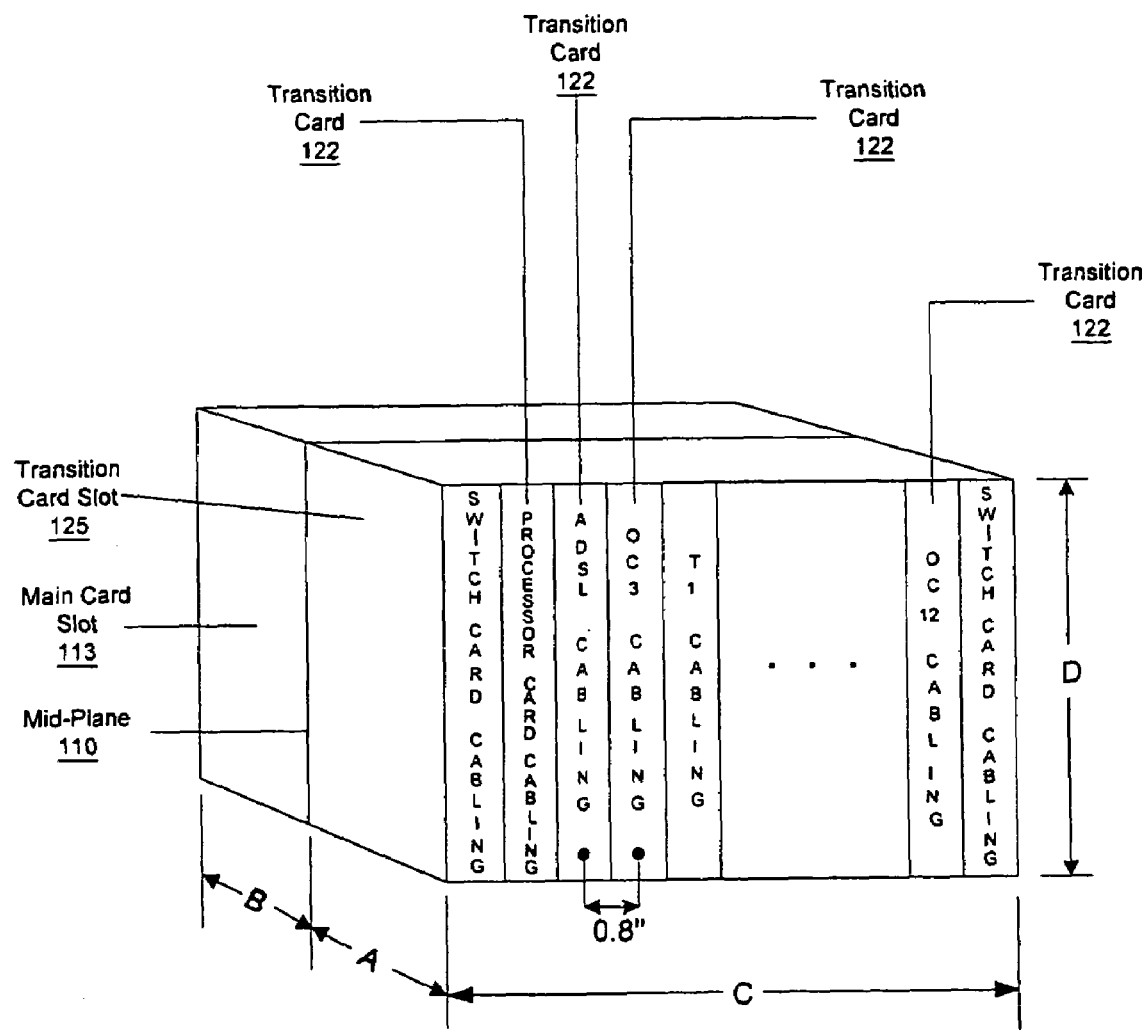

FIGS. 2a–b show a second embodiment of rack mount system 100 according to the present invention. In the second embodiment, rack mount system 100 includes two switch cards, i.e., the two switch cards 116b, rather than a single switch card as in the first embodiment. Here, whenever information is routed from one of the main cards to another one of the main cards, two sets of that information is routed, one set of information is routed to one of the switch cards 116b and the other set of information, that is a duplicate of the first set of information, is routed to the other switch card 116b. Therefore, the particular one of the main cards transmitting the information sends two identical sets of information, one set of information to each of the switch cards 116b. As will be explained in greater detail below, information is transferred between main cards 119 and switch cards 116b via dedicated point-to-point differential copper pairs. Each of the main cards connects to both of the switch cards 116b, and each of these connections uses two differential copper pairs—one for transmitting the information and another for receiving the information.

For each of the two sets of identical information, switch cards 116b route the information to the appropriate one of the main cards 119 using the messaging protocol destination address. Since both sets of information are identical (including the messaging protocol destination address) and thus are destined for the same main card, each of the switch cards 116b transfers the information for which its responsible for routing to the same main card. Information is transferred from the particular one of the switch cards 116b to one of the main cards 119 that is the intended destination using dedicated point-to-point differential copper pairs. The particular one of the main cards 119 that is the intended destination receives one set of information from switch card 116b via a differential copper pair. That destination main card also receives the other set of information from the other switch card 116b via another differential copper pair. The destination main card chooses the particular one of the information that is first to arrive. If this information does not have an error, then the destination main card chooses this information for use, otherwise, the information with the error is discarded and the other set of information that arrives later is selected by the destination main card for use.

Figure 3:
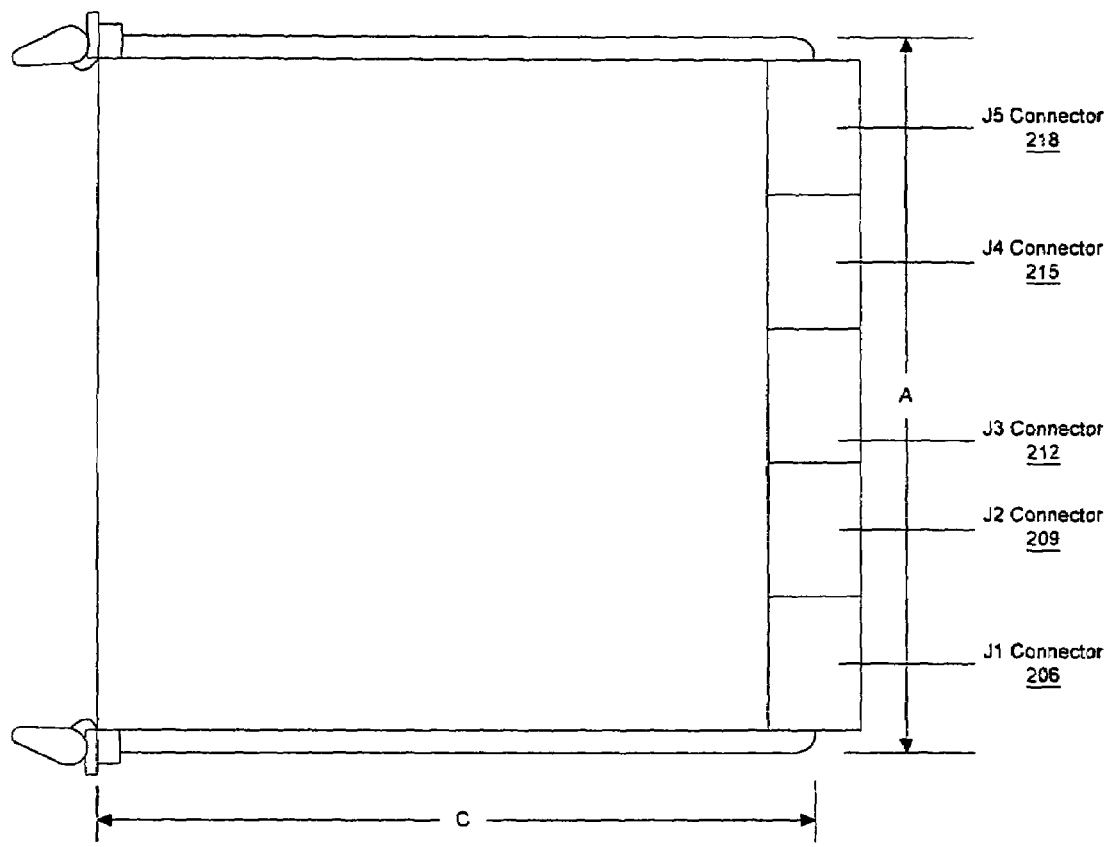
FIG. 3 shows a front side add-in card.

FIG. 3 shows a front side add-in card 203. Front side add-in card 203 may be any one of the main cards or switch cards. Front side add-in card 203 has the 6U form factor, i.e., it has a height A of 9.20 inches and a depth C of 6.30 inches. Front side add-in card 203 includes the following five connectors: a J1 connector 206, a J2 connector 209, a J3 connector 212, a J4 connector 215, and a J5 connector 218. These five connectors have female receptacles and the signal lines for transferring information are differential copper pairs. J1 connector 206 implements 32-bit PCI. J2 connector 209 implements 64-bit PCI. Taken together, J1 connector 206 and J2 connector 209 constitute the CompactPCI bus. J4 connector 215 provides access to the H.110 bus. The standard that specifies the H.110 bus is known as the computer telephony specification or PICMG 2.5. The H.110 bus provides 4,096 bidirectional timeslots, each with a capacity of 64 Kbit/s resulting in a transfer rate of 256 MBit/s. By only having 4,096 timeslots available, the typical application using the H.110 bus produces the need for buffering. J5 connector 218 can be used to provide access to other external input and output signals. For example, J5 connector 218 may provide the connections from front side add-in cards (e.g., main cards and switch cards) to the back side add-in cards (e.g., transition cards).

J3 connector 212 provides access to one or more switched Ethernet interconnects. The switched Ethernet interconnect may be implemented using differential copper pairs integrated into mid-plane 110, or the switched Ethernet interconnect may be implemented using differential copper pairs on the external cables that are attached to transition cards 122 (when J3 connector 212 connects to mid-plane 110, there's an automatic connection to the corresponding transition card, if one is present, and an external cable can be connected to that transition card). The switched Ethernet interconnect supports all the cards in main card slot 113, i.e., allows all the cards on main card slot 113 to be interconnected. The bandwidth of the switch is the aggregate of all serial communication links within main card slot 113. Each of the serial communication links has a transfer rate of 100 MBit/s resulting in a switching bandwidth of 2.0 Gbit/s. This higher switching bandwidth compared to the H.110 bus results in more timeslots and the ability to satisfy the requirements of contemporary applications.

Figure 4:
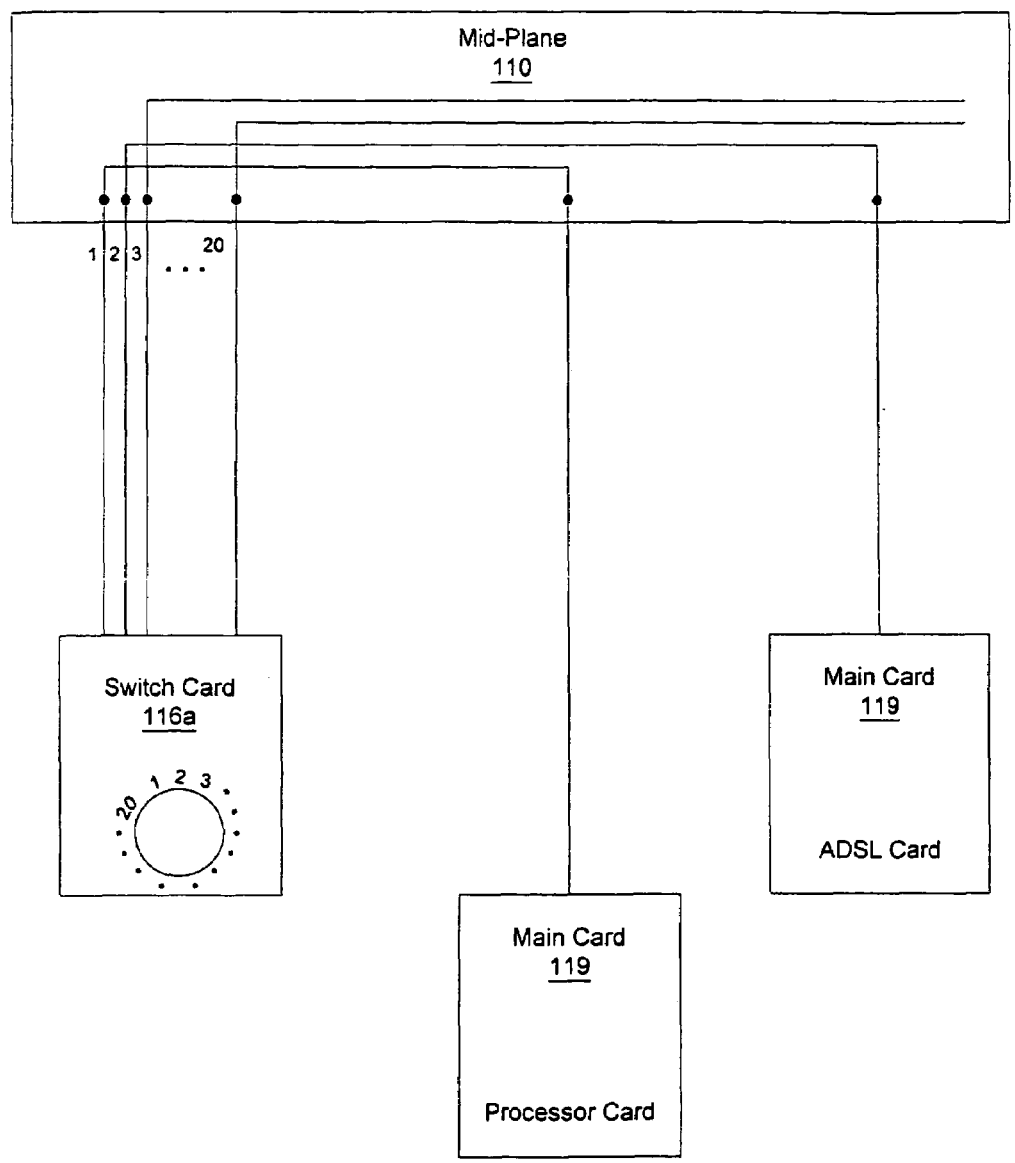
FIG. 4 shows a first embodiment of an architecture for the rack mount system according to the present invention.

FIG. 4 shows a first embodiment of an architecture for the rack mount system 100 according to the present invention. In this embodiment, the differential copper pairs of the switched Ethernet interconnect are integrated within mid-plane 110. Here, only one switch card is used and each of the main cards 119 are linked to switch card 116a. Each of these links (in FIG. 4, the links are labeled from 1 to 20) includes two differential copper pairs (one differential copper pair for transmitting information and another differential copper pair for receiving information) that are integrated within midplane 110. Each of the links of the switched Ethernet interconnect transfers information between main cards 119 and switch card 116a at the rate of 100 MBit/s. Each of the main cards 119 and switch card 116a have J3 connector 212 and use this connector to link to the switched Ethernet interconnect integrated within mid-plane 110.

In the embodiment shown in FIG. 4, rack mount system 100 includes switch card 116a that supports up to twenty different main cards 119 since rack mount system 100 can hold up to twenty-one different add-in cards and given that switch card 116a occupies one of those slots, twenty other slots remain for main cards 119. The switched Ethernet interconnect shown in FIG. 4 allows a particular one of the main cards 119 to communicate with all the other main cards 119 inserted into rack mount system 100. The communication may occur by a particular one of the main cards 119 transmitting information to switch cards 116a via the switched Ethernet interconnect (i.e., a dedicated differential copper pair between the particular one of the main cards 119 and switch card 116a) integrated within mid-plane 110. Switch cards 116a routes the information to the appropriate one of the main cards 119 that is the intended destination using the messaging protocol destination address (the messaging protocol destination address is provided by the Ethernet protocol) via the switched Ethernet interconnect (i.e., a dedicated differential copper pair between switch card 116a and the particular one of the main cards 119 that is the intended destination) integrated within mid-plane 110.

Figure 5:
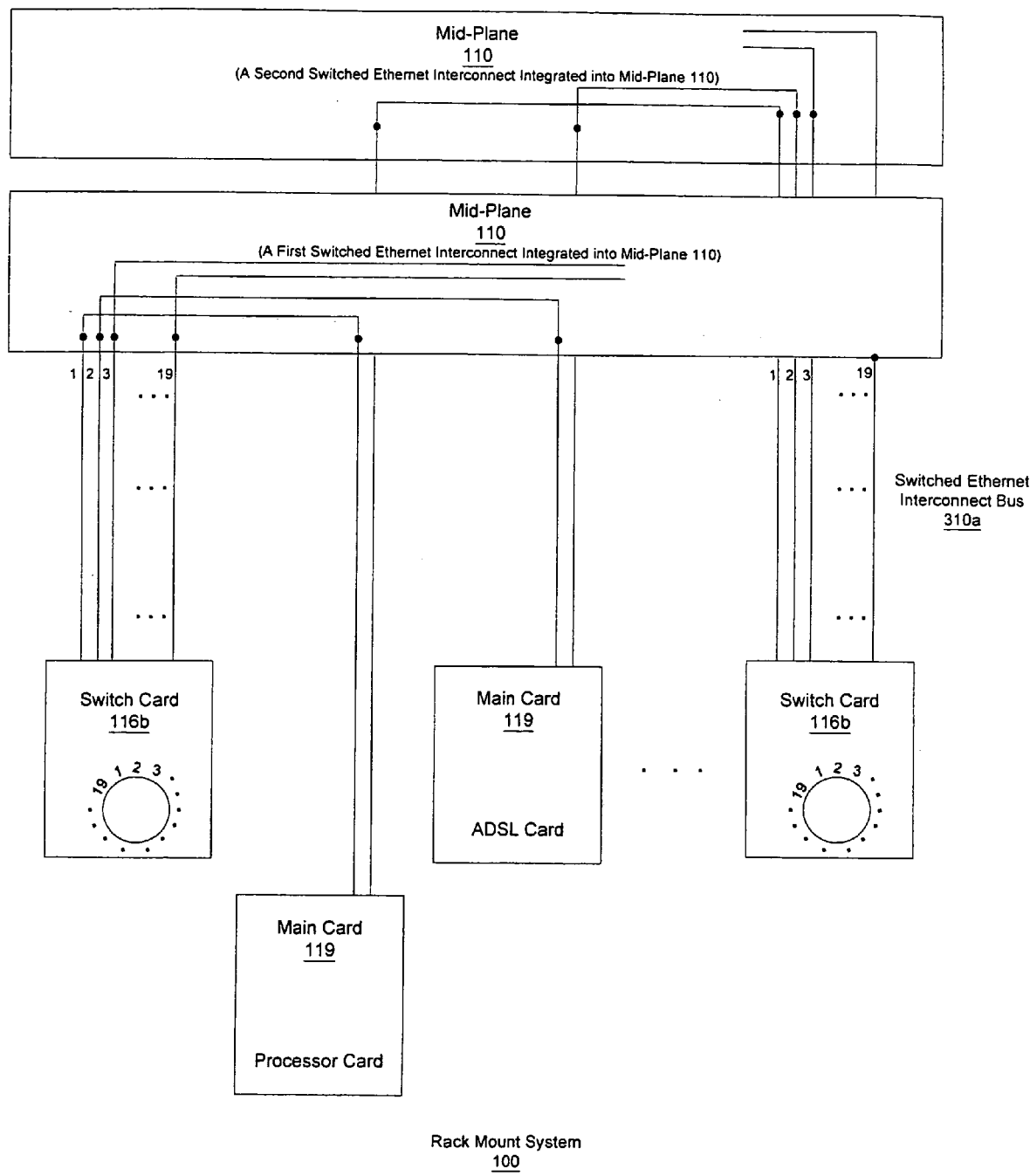
FIG. 5 shows a second embodiment of the architecture for the rack mount system according to the present invention.

FIG. 5 shows a second embodiment of the architecture for rack mount system 100 according to the present invention. In this embodiment, rack mount system 100 includes two switch cards 116b and two switched Ethernet interconnects. Each of the two switch cards 116b uses a different one of the two switched Ethernet interconnects; in FIG. 5, one of the switch cards 116b uses a first switched Ethernet interconnect that is integrated into mid-plane 110, and the other one of the switch cards 116b uses a second switched Ethernet interconnect that is integrated into mid-plane 110.

In this embodiment, each of the main cards 119 are linked to both of the switch cards 116b. Each of these links (in FIG. 5, the links are labeled from 1 to 19) includes two differential copper pairs (one differential copper pair for transmitting information and the other differential copper pair for receiving information) that are integrated within mid-plane 110. In this embodiment, nineteen links exist because each of the switch cards 116b may support up to nineteen different main cards 119 since rack mount system 100 can hold up to twenty-one different add-in cards and given that the two switch cards 116b occupy two of those slots, nineteen other slots remain for main cards 119. Each of the links of the switched Ethernet interconnect transfers information between main cards 119 and switch cards 116b at the rate of 100 MBit/s. Each of the main cards 119 and each of the switch cards 116b have J3 connector 212 and use this connector to link to the two switched Ethernet interconnects integrated within mid-plane 110.

In this embodiment, the second switch card routes a second set of information, that is identical to the first set of information, to the particular one of the main cards 119 that is the intended destination via the second switched Ethernet interconnect and this is done for redundancy purposes, i.e., if the intended destination main card (the main card that the first and second sets of information are destined) finds that the first-to-arrive set of information has an error, then that set of information is discarded and the destination main card uses the other, later-to-arrive set of information.

In this embodiment, each of the main cards 119 is connected to both the first switched Ethernet interconnect and the second switched Ethernet interconnect. One of the switch cards 116b is connected to the first switched Ethernet interconnect and the other switch card 116b is connected to the second switched Ethernet interconnect. Each of the main cards 119 transmits two sets of information that are identical—one set of information is transmitted to one of the switch cards 116b via the first switched Ethernet interconnect and the other set of information is transmitted to the other switch card 116b via the second switched Ethernet interconnect. One of the switch cards 116b routes the first set of information to the appropriate one of the main cards 119 that is the intended destination using the messaging protocol destination address (the messaging protocol destination address is provided by the Ethernet protocol) via the first switched Ethernet interconnect. The other switch card 116b routes the second set of information (as stated earlier, the second set of information is identical to the first set of information) to the appropriate one of the main cards 119 that is the intended destination using the messaging protocol destination address via the second switched Ethernet interconnect. The particular one of the main cards 119 that is the intended destination takes the set of information that is the first to arrive from either one of the two switch cards 116b. If the particular main card that is the intended destination does not detect an error in the set of information that is first to arrive then that set of information is used by the main card, however, if the set of information that is first to arrive does have an error then the first set of information is discarded and the second set of information (the second set of information is identical to the first set of information) that arrives later is used by the particular main card.

Figure 6:
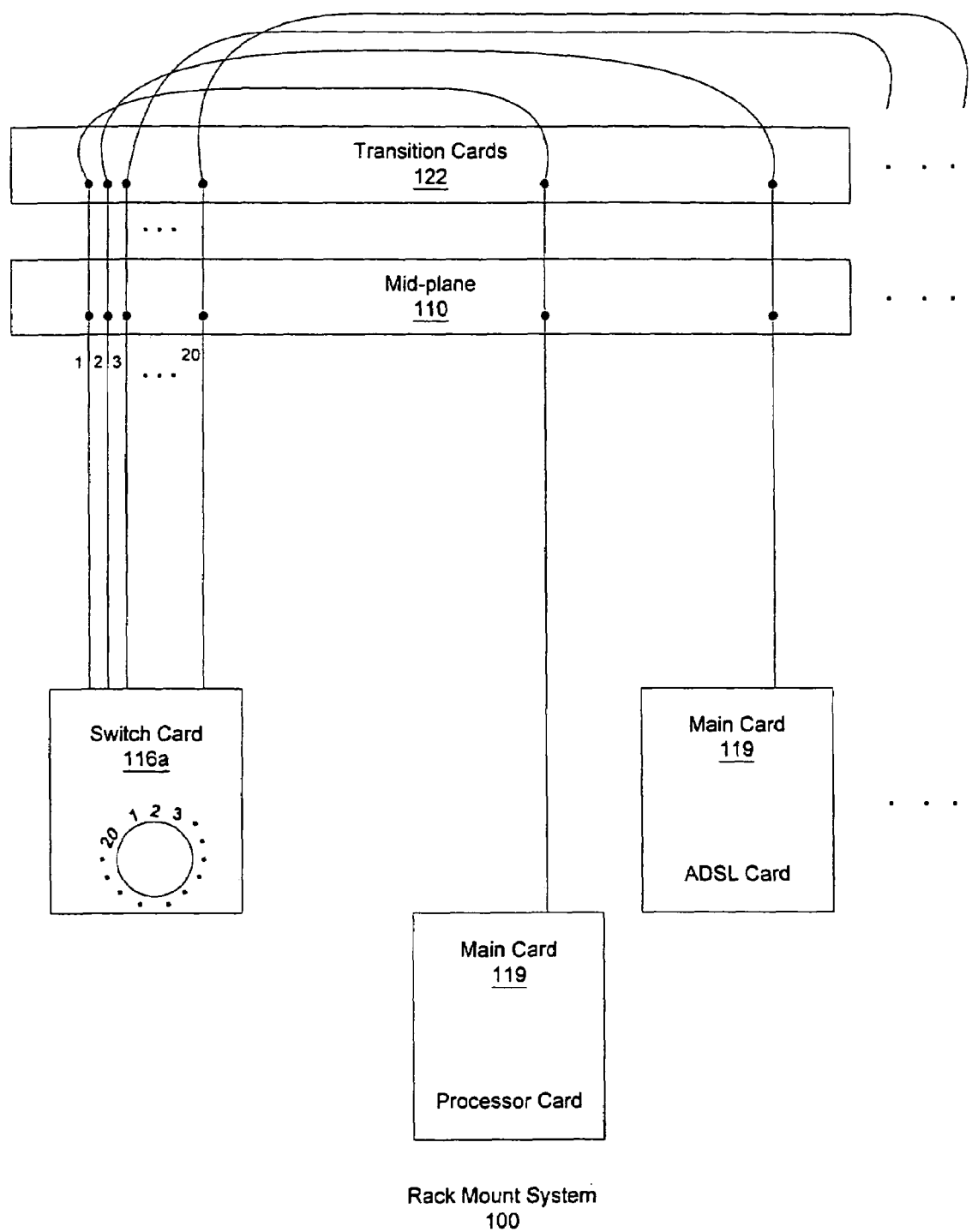
FIG. 6 shows a third embodiment of the architecture for the rack mount system according to the present invention.

FIG. 6 shows a third embodiment of the architecture for rack mount system 100 according to the present invention. In this embodiment, rather than integrating the switched Ethernet interconnect within mid-plane 110, the switched Ethernet interconnect is implemented using external cables attached to transition cards 122 inserted into transition card slot 125. Here, the physical connection of main cards 119 and switch card 116a to mid-plane 110 is extended to transition card slot 125 such that by connecting to mid-plane 110, main cards 119 and switch card 116a also connect to the corresponding transition cards 122 inserted into transition card slot 125. The switched Ethernet interconnect is implemented using external cables that are connected to transition cards 122 inserted into transition card slot 125 (i.e., the external cables provide the point-to-point differential copper pairs for the switched Ethernet interconnect). Each of the main cards 119 links to switch card 116a using an external cable attached to the two transition cards 122 corresponding to the particular one of the main cards 119 and switch card 116a. In this embodiment, twenty such external cables are used to connect each of the twenty main cards 119 to switch card 116a. Each of the external cables (in FIG. 6, the cables, i.e., links, are labeled from 1 to 20) includes two differential copper pairs (one differential copper pair for transmitting information and the other differential copper pair for receiving information).

Each of the external cables of the switched Ethernet interconnect transfers information between main cards 119 and switch card 116a at the rate of 100 MBit/s. Each of the main cards 119 and switch card 116a have J3 connector 212 and use this connector to link to mid-plane 110. In this embodiment, rack mount system 100 includes switch card 116a that supports up to twenty different main cards 119 since rack mount system 100 can hold up to twenty-one different add-in cards and given that switch card 116a occupies one of those slots, twenty other slots remain for main cards 119. The switched Ethernet interconnect shown in FIG. 6 allows a particular one of the main cards 119 to communicate with all the other main cards 119 inserted into rack mount system 100. The communication may occur by a particular one of the main cards 119 transmitting information to switch cards 116a via the switched Ethernet interconnect (i.e., an external cable between the particular one of the main cards 119 and switch card 116a). Switch cards 116a routes the information to the appropriate one of the main cards 119 that is the intended destination using the messaging protocol destination address (the messaging protocol destination address is provided by the Ethernet protocol) via the switched Ethernet interconnect (i.e., an external cable between switch card 116a and the particular one of the main cards 119 that is the intended destination).

Figure 7:
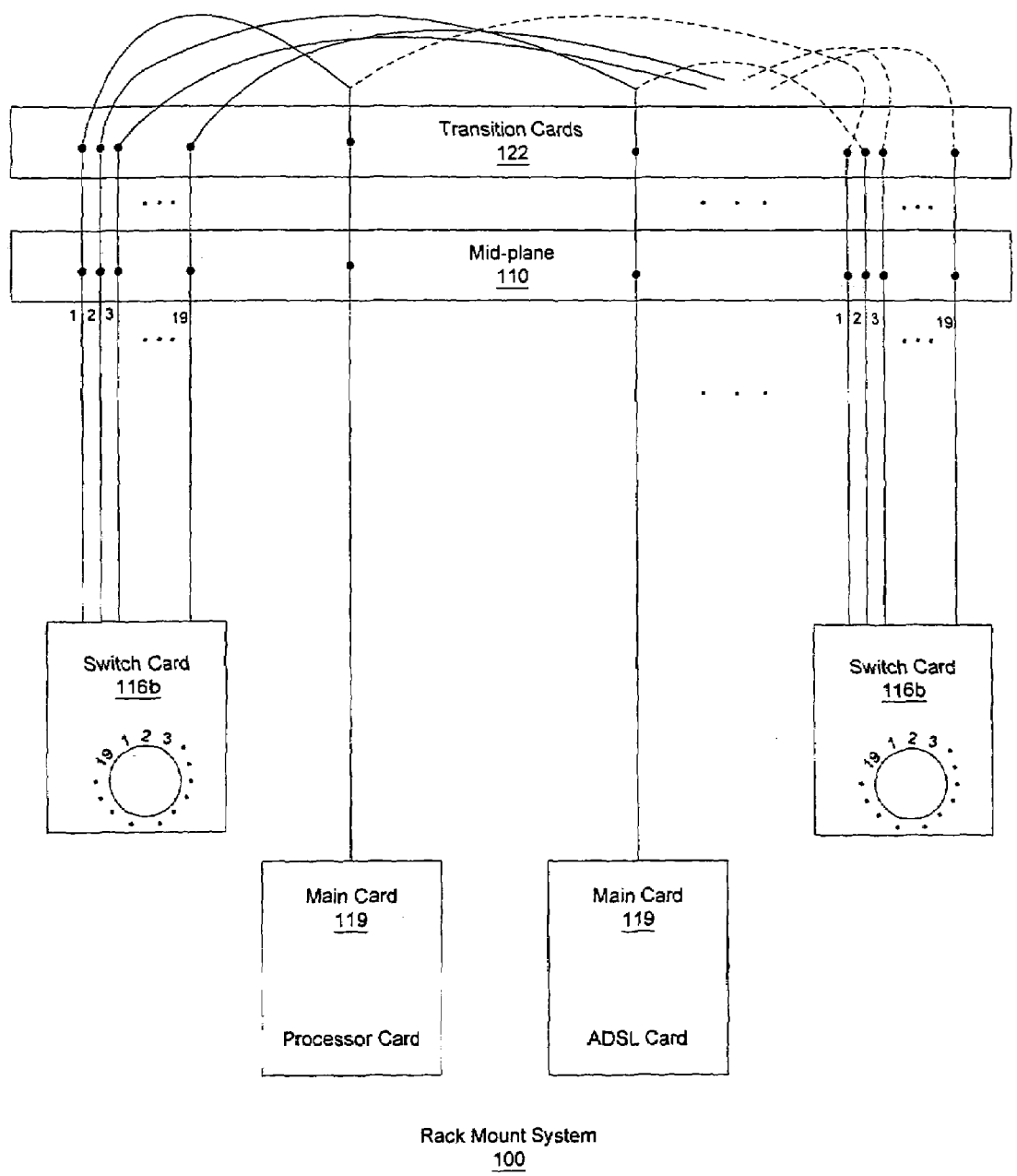
FIG. 7 shows a fourth embodiment of the architecture for the rack mount system according to the present invention.

FIG. 7 shows a fourth embodiment of the architecture for rack mount system 100 according to the present invention. In this embodiment, rack mount system 100 includes two switch cards 116b and two switched Ethernet interconnects. Here, rather than integrating the two switched Ethernet interconnects within mid-plane 110, the two switched Ethernet interconnects are implemented using external cables attached to transition cards 122 inserted into transition card slot 125 (the details are provided above in the third embodiment).

In FIG. 7, one of the switch cards 116b uses a first switched Ethernet interconnect (in FIG. 7, the external cables of the first switched Ethernet interconnect is represented by the curved solid lines exiting transition card slot 125), and the other one of the switch cards 116b uses a second switched Ethernet interconnect (in FIG. 7, the external cables of the second switched Ethernet interconnect is represented by the curved dotted lines exiting transition card slot 125).

In this embodiment, each of the main cards 119 links to each of the two switch cards 116b using an external cable attached between the two transition cards 122 corresponding to the particular one of the main cards 119 and the particular one of the two switch cards 116b. Here, thirty-eight such cables are used to connect each of the nineteen main cards 119 to each of the two switch cards 116b. Each of the external cables (in FIG. 7, the cables, i.e., links, are labeled from 1 to 19) include two differential copper pairs (one differential copper pair for transmitting information and the other differential copper pair for receiving information). In this embodiment, nineteen links exist between the main cards 119 and each of the two switch cards 116b because each of the switch cards 116b may support up to nineteen different main cards 119 since rack mount system 100 can hold up to twenty-one different add-in cards and given that the two switch cards 116b occupy two of those slots, nineteen other slots remain for main cards 119.

Each of the external cables of the switched Ethernet interconnect transfers information at the rate of 100 MBit/s. Each of the main cards 119 and each of the two switch cards 116b have J3 connector 212 and use this connector to link to mid-plane 110. In this embodiment, all of the main cards 119 can communication with all the other main cards 119 inserted into rack mount system 100. Here, the second switch card routes a second set of information, that is identical to the first set of information, to the particular one of the main cards 119 that is the intended destination via the second switched Ethernet interconnect and this is done for redundancy purposes, i.e., if the intended destination main card (the main card that the first and second sets of information are destined) finds that the first-to-arrive set of information has an error, then that set of information is discarded and the destination main card uses the other, later-to-arrive set of information.

In FIG. 7, the cables of the first switched Ethernet interconnect are represented by the solid lines out of transition cards 122 and the cables of the second switched Ethernet interconnect are represented by the dotted lines out of transition cards 122. One of the switch cards 116b is connected to the first switched Ethernet interconnect and the other one of the switch cards 116b is connected to the second switched Ethernet interconnect. Each of the main cards 119, using external cables, is connected to both the first switched Ethernet interconnect and the second switched Ethernet interconnect.

Each of the main cards 119 transmits two sets of information that are identical—one set of information is transmitted to one of the switch cards 116b via the first switched Ethernet interconnect and the other set of information is transmitted to the other switch card 116b via the second switched Ethernet interconnect. One of the switch cards 116b routes the first set of information to the appropriate one of the main cards 119 that is the intended destination using the messaging protocol destination address (the messaging protocol destination address is provided by the Ethernet protocol) via the first switched Ethernet interconnect. The other switch card 116b routes the second set of information (as stated earlier, the second set of information is identical to the first set of information) to the appropriate one of the main cards 119 that is the intended destination using the messaging protocol destination address via the second switched Ethernet interconnect. The particular one of the main cards 119 that is the intended destination takes the set of information that is the first to arrive from either one of the two switch cards 116b. If the particular main card that is the intended destination does not detect an error in the set of information that is first to arrive then that set of information is used by the main card, however, if the set of information that is first to arrive does have an error then the first set of information is discarded and the second set of information (the second set of information is identical to the first set of information) that arrives later is used by the particular main card.

Figure 8:
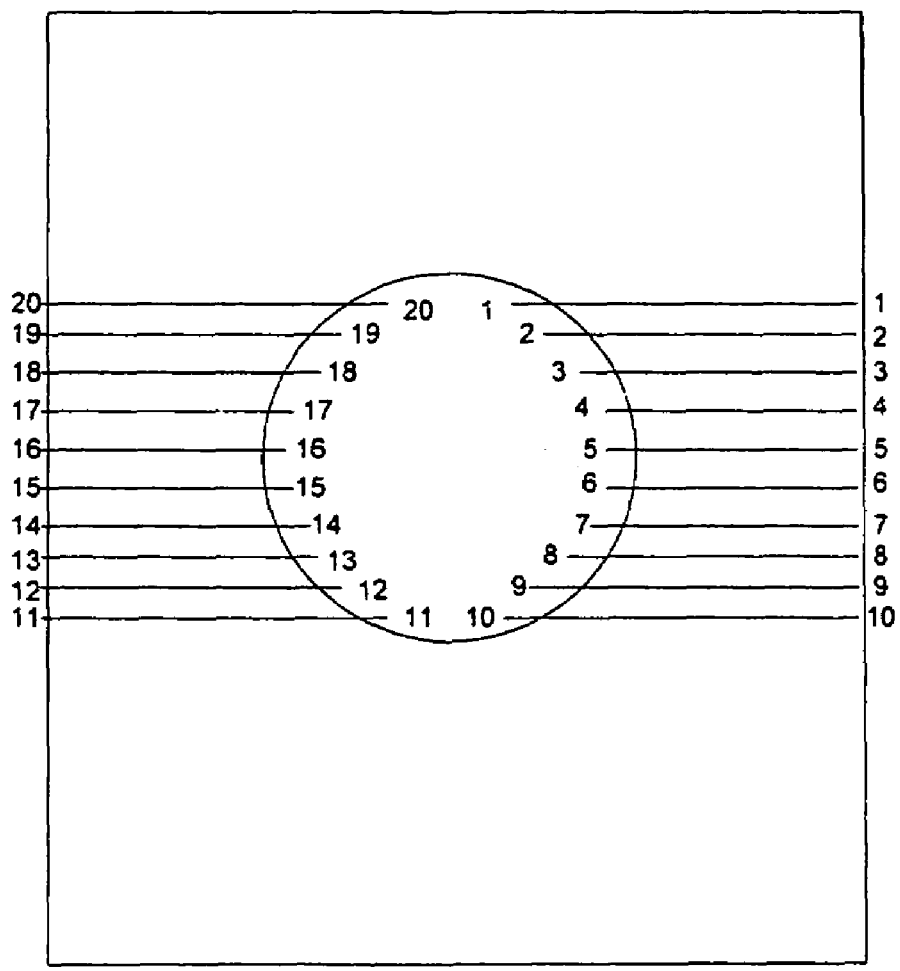
FIG. 8 shows the internal connections of a switch card when the rack mount system uses only one switch card.

FIG. 8 shows the internal connections of switch card 116a. Switch card 116a is the switch card used when rack mount system 100 is configured to have only one switch card. Here, switch card 116a has the 6U form factor and thus has a height of 9.20 inches and a depth of 6.30 inches. Switch card 116a has connections to each of the main cards 119 inserted into rack mount system 100. Switch card 116a may support up to twenty different main cards 119 since rack mount system 100 can hold up to twenty-one different add-in cards and given that switch card 116a occupies one of those slots, twenty other slots remain for main cards 119. Each of the twenty connections uses two differential copper pairs, one pair for receiving information and the other pair for transmitting information. Upon receiving the information, switch card 116a uses the destination address provided by the information (as stated earlier, the Ethernet protocol provides a messaging protocol destination address) to route that information to the appropriate one of the main cards 119 as specified by the destination address. Switch card 116a has a star arrangement in which switch card 116a acts as a central switching element that has connections to all the main cards 119 in rack mount system 100.

If rack mount system 100 includes two switch cards (rather than one switch card as shown in FIG. 8), then the switch card would only have up to nineteen different connections since rack mount system 100 can hold up to twenty-one different add-in cards and given that the two switch cards occupy two of those slots, nineteen other slots remain for main cards 119. Since two switch cards are used, this configuration of rack mount system 100 provides for data redundancy.

Figure 9:
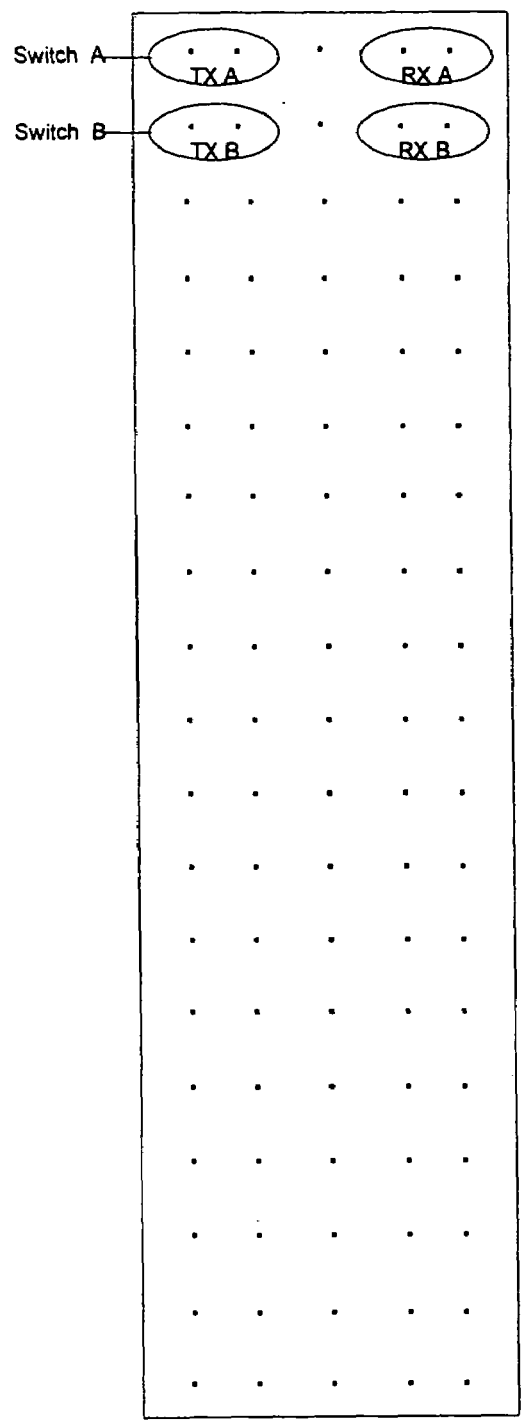
FIG. 9 shows the J3 connector of one of the main cards.

FIG. 9 shows J3 connector 212 of one of the main cards 119 in which rack mount system 100 includes two switch cards 116b. In FIG. 9, a pair of pins make up a differential copper pair. Each of the main cards 119 has a differential copper pair for transmitting information (in FIG. 9, that pair is denoted as TX_A) to a first switch card (e.g., the first switch card may be one of the switch cards 116b) and a second differential copper pair to receive routed information from the first switch card (in FIG. 9, that pair is denoted RX_A). Since rack mount system 100 is set up to provide redundant data (i.e., two switch cards 116b are used), then each of the main cards 119 transmits the same information to the second switch card and thus a third differential copper pair is used to transmit that information to the second switch card (in FIG. 9, that pair is denoted as TX_B), and a fourth differential copper pair is used to receive routed information from the second switch card (in FIG. 9, that pair is denoted as RX_B).

If rack mount system 100 includes only one switch card (e.g., switch card 116a), then one differential copper pair is used to transmit information to that switch card (for example, in FIG. 9, that pair is denoted as TX_A) and a second differential copper pair is used to receive information from that switch card (for example, in FIG. 9, that pair is denoted RX_A).

Figure 10:
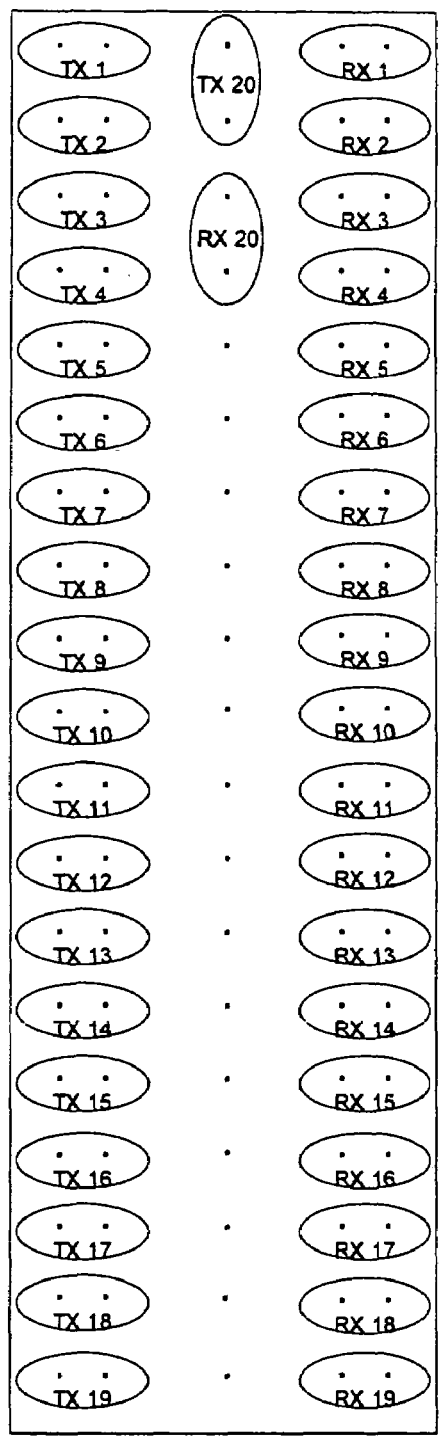
FIG. 10 shows the J3 connector of one of the switch cards.

FIG. 10 shows J3 connector 212 of switch card 116a. Switch card 116a is used in a configuration of rack mount system 100 having only one switch card (i.e., rack mount system 100 is not configured for data redundancy). Because only one switch card is used, a maximum of twenty different main cards 119 may be inserted into rack mount system 100. Switch card 116a has twenty different connections, one for each of the twenty different main cards 119. Each of these connections uses two differential copper pairs. One differential copper pair is used for transmitting information to a particular one of the main cards 119 after it has been routed by switch card 116a (in FIG. 10, those pairs are designated as TX_1, TX_2, TX_3, . . . , and TX_20) and the other differential copper pair is used for receiving information from a particular one of the main cards 119 (in FIG. 10, those pairs are designated as RX_1, RX_2, RX_3, . . . , and RX_20). Switch card 116a may use the differential copper pair designated TX_1 to transmit routed information to the main card in slot one, the differential copper pair designated TX_2 may be used to transmit routed information to the main card in slot two, and continuing in this manner, the differential copper pair designated TX_20 may be used to transmit routed information to the main card in slot twenty. Switch card 116a may use the differential copper pair designated RX_1 to receive information from the main card in slot one, the differential copper pair designated RX_2 may be used to receive information from the main card in slot two, and continuing in this manner, the differential copper pair designated RX_20 may be used to receive information from the main card in slot twenty.

If the rack mount system 100 employs two switch cards then a maximum of nineteen different main cards 119 may be inserted into rack mount system 100. The switch card (e.g., switch card 116*b*) has up to nineteen different connections, one for each of the nineteen possible main cards 119 in rack mount system 100. Each of these connections uses two differential copper pairs. One differential copper pair is used for transmitting information to a particular one of the main cards 119 after it has been routed by the switch card and the other differential copper pair is used for receiving information from a particular one of the main cards 119. In the case that two switch are used, J3 connector 212 would be configured similarly to the connector shown in FIG. 10 except that TX_20 and RX_20 would not exist.

Figure 11:
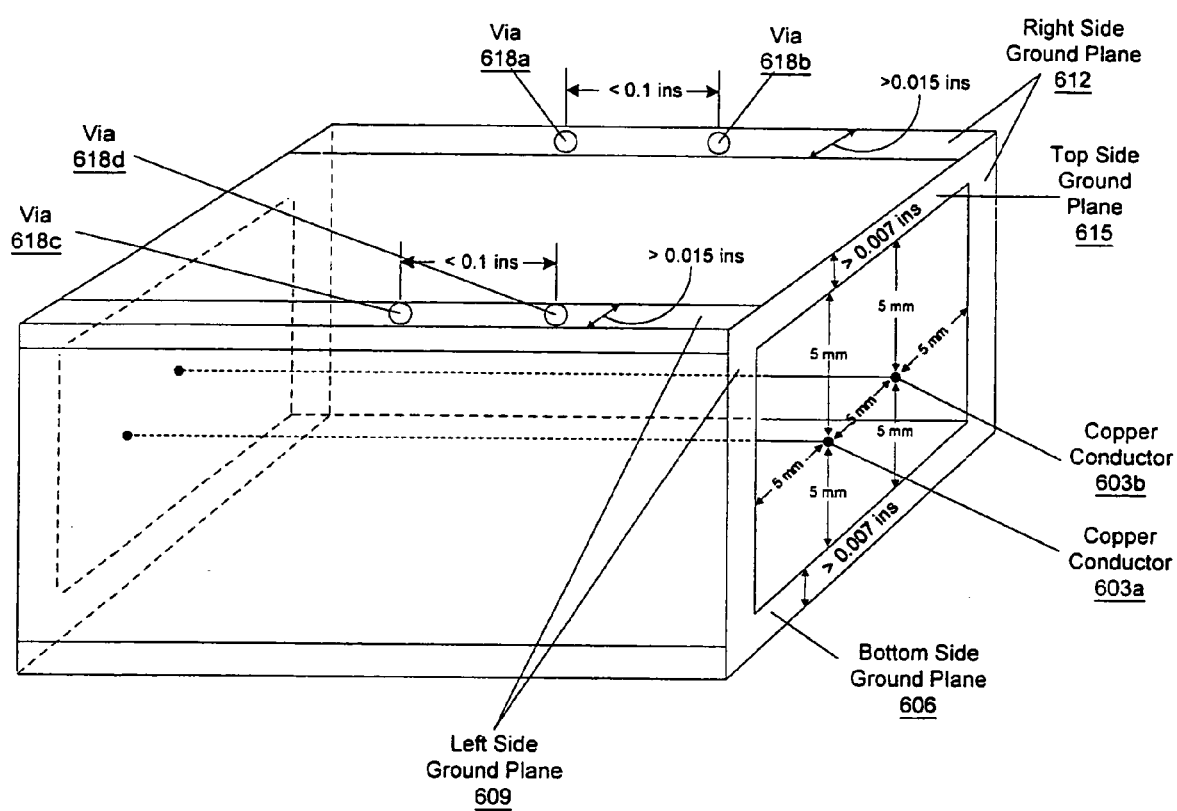
FIG. 11 shows an embodiment of a differential copper pair used to implement the switched Ethernet interconnect within mid-plane 110 according to the present invention.

FIG. 11 shows an embodiment of a differential copper pair used to implement the switched Ethernet interconnect within mid-plane 110 (FIG. 1) according to the present invention. In this embodiment the differential copper pairs are integrated within the mid-plane 110 (FIG. 1) and used to transfer information between main cards 119 (FIG. 1) and the switch cards. Here, the conductors and insulators in the differential copper pair are spaced at certain distances and certain material is used to attain a fixed impedance so that information can be transferred on the differential copper pairs at rates of, for example, 10 Gbit/s. The differential copper pair integrated into mid-plane 110 (FIG. 1) includes a copper conductor 603*a* and a copper conductor 603*b* that are parallel to each other and spaced 5.0 millimeters apart. A left side ground plane 609 is used for grounding and is at least 0.015 inches thick and is parallel to both copper conductor 603*a* and copper conductor 603*b*. Left side ground plane 609 is 5.0 millimeters to the left of copper conductor 603*a* and 10.0 millimeters to the left of copper conductor 603*b*. A right side ground plane 612 used for grounding is at least 0.015 inches thick and is parallel to left side ground plane 609. Right side ground plane 612 is 5.0 millimeters to the right of copper conductor 603*b* and 10.0 millimeters to the right of copper conductor 603*a* and 15.0 millimeters to the right of left side ground plane 609.

A top side ground plane 615 is used for grounding and is at least 0.007 inches thick and perpendicularly connected to the top edges of left side ground plane 609 and right side ground plane 612. Top side ground plane 615 is 5.0 millimeters above both copper conductor 603*a* and copper conductor 603*b*. A bottom side ground plane 606 is at least 0.007 inches thick and is parallel to top side ground plane 615 and perpendicularly connected to the bottom edges of left side ground plane 609 and right side ground plane 612. Bottom ground plane 606 is 5.0 millimeters below both copper conductor 603*a* and copper conductor 603*b*.

Vias are holes drilled through a board and used to connect one or more layers of a printed circuit board ("PCB"). In this embodiment, right side ground plane 612 has a via 618*a* and a via 618*b* that are used to connect top side ground plane 615 and bottom side ground plane 606. Here, via 618*a* and via 618*b* are less than 0.1 inches apart. Left side ground plane 609 has a via 618*c* and a via 618*d* that are also used to connect top side ground plane 615 with bottom side ground plane 606. Via 618*c* and via 618*d* are also less than 0.1 inches apart.

Figure 12:
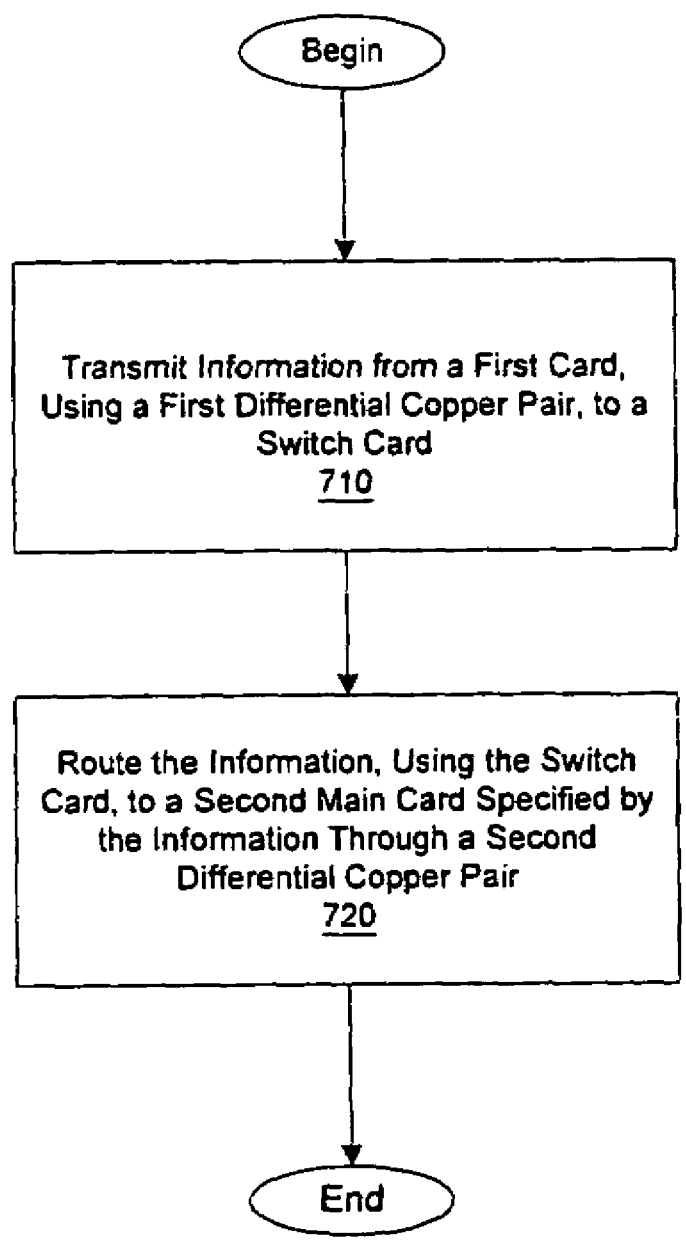
FIG. 12 shows a flowchart describing a first embodiment of the process for transferring information between main cards according to the present invention.

FIG. 12 shows a flowchart describing a first embodiment of the method for sending information between main cards 119 according to the present invention. In this embodiment, only one switch card is used in rack mount system 100. Because only one switch card is used, no data redundancy is provided. In block 710, a particular one of the main cards 119 transmits information to a switch card (e.g., switch card 116*a*). The information is transmitted using a differential copper pair on the particular main card assigned to transmit information to the switch card (e.g., in FIG. 9, the transmission may occur using differential cooper pair TX_A). The switch card receives the information through the differential copper pair assigned to the particular one of the main cards 119 transmitting the information (e.g., in FIG. 10, if the main card in slot 9 was transmitting the information, then the switch card would receive the information through the differential copper pair designated RX_9).

In block 720, the switch card routes the information to a particular one of the destination main cards 119 using the messaging protocol destination address that is provided with the information (as indicated earlier, the Ethernet protocol provides the messaging protocol destination address). The messaging protocol destination address supplies the address of the particular one of the main cards 119 to which the information is destined. The switch card transmits the routed information to the particular one of the main cards 119 that the information is destined using the corresponding differential copper pair (e.g., in FIG. 10, if the main card in slot 12 is the destination for the information, then the switch card would transmit the information using TX_12).

As indicated earlier, the differential copper pairs (i.e., the differential copper pairs that make up the switched Ethernet interconnect) may be either integrated within mid-plane 110 or on the external cables.

Figure 13:
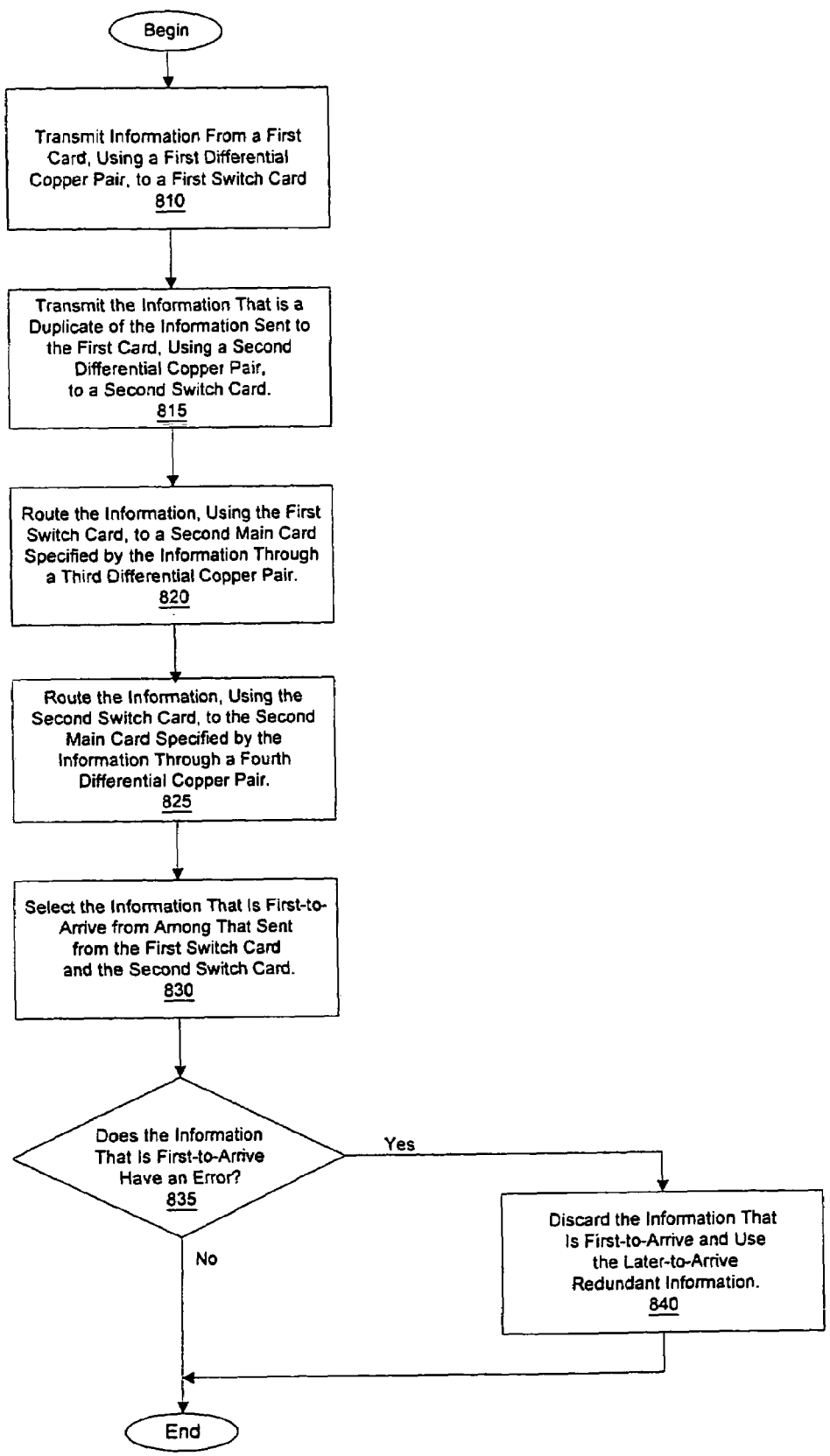
FIG. 13 shows a flowchart describing a second embodiment of the process for transferring information between main cards according to the present invention.

FIG. 13 shows a flowchart describing a second embodiment of the method for sending information between main cards 119 according to the present invention. In this embodiment, two switch cards are used and thus data redundancy is provided to account for errors in transmission. In block 810, a first main card (the first main card may be any of the main cards in main card slot 113) transmits information to a first switch card (either of the switch cards 116*b*). The information is transmitted from the first main card to the first switch card using a differential copper pair assigned to transmitting information from the first main card to the first switch card (e.g., in FIG. 9, the transmission would occur using differential copper pair TX_A if that differential copper pair corresponded to the first switch card, or the transmission would occur using differential copper pair TX_B if that differential copper pair corresponded to the first switch card). The first switch card receives the information through the differential copper pair assigned to the first main card (e.g., in FIG. 10, if the first main card is the main card in slot 9, then the first switch card would receive the information through the differential copper pair designated RX_9).

In block 815, the first main card transmits the same information sent to the first switch card to a second switch card (the second switch card is the other one of the switch cards 116*b* that is not the first switch card). The information is transmitted from the first main card to the second switch card using a differential copper pair assigned to transmitting information from the first main card to the second switch card (e.g., in FIG. 9, the transmission would occur using differential copper pair TX_A if that differential copper pair corresponded to the second switch card, or the transmission would occur using differential copper pair TX_B if that differential copper pair corresponded to the second switch card). The second switch card receives the information through the differential copper pair assigned to the first main card (e.g., in FIG. 10, if the first main card is the main card in slot 9, then the second switch card would receive the information through the differential copper pair designated RX_9).

In block 820, the information received by the first switch card is routed to a second main card (the second main card may be any of the main cards in main card slot 113). The first switch card routes the information to the second main card using the messaging protocol destination address that is provided with the information (as indicated earlier, the Ethernet protocol provides the messaging protocol destination address). The first switch card transmits the routed information to the second main card that is the intended destination using the differential copper pair on the first switch card that is assigned to the second main card (e.g., in FIG. 10, if the main card in slot 12 of main card slot 113 is the second main card, then the first switch card would transmit the routed information using TX_12).

In block 825, the information received by the second switch card is routed to the second main card (the information received by the second switch card is identical to the information received by the first switch card). Again, the second switch card routes the information to the second main card using the messaging protocol destination address that is provided with the information. The second switch card transmits the routed information to the second main card that is the intended destination using the differential copper pair on the second switch card that is assigned to the second main card (e.g., in FIG. 10, if the main card in slot 12 of main card slot 113 is the second main card, then the second switch card would transmit the routed information using TX_12).

In block 830, the second main card selects the information that is first to arrive from among that sent from the first switch card and the second switch card. In decision block 835, the second main card determines if the information that is first-to-arrive is error-free. If the information that is first-to-arrive has an error, then in block 840, that information is discarded and the second main card uses the later-to-arrive information (as indicated earlier, the later-to-arrive information is a duplicate of the earlier-to-arrive information) if the information that is first-to-arrive does not have an error, then the second main card uses that information rather than the later-to-arrive information.

As indicated earlier, the differential copper pairs (i.e., the differential copper pairs that make up the switched Ethernet interconnect) may be either integrated within mid-plane 110 or on the external cables.

Although embodiments are specifically illustrated and described herein, it will be appreciated that modifications and variations of the present invention are covered by the above teachings and within the purview of the appended claims without departing from the spirit and intended scope of the invention.

What is claimed is:

1. A system to obtain a fixed impedance in a differential copper pair, comprising:
   a first copper conductor extended along an axis;
   a second copper conductor positioned substantially parallel along the axis, wherein the second copper conductor is spaced approximately 5 millimeters from the first copper conductor; and
   an insulating casing encompassing the first copper conductor and the second copper conductor, wherein the insulating casing includes two substantially parallel side-ground-planes and two substantially parallel vertical-ground-planes, wherein the two side-ground-planes are each at least 0.015 inches thick and the two vertical-ground-planes are each at least 0.007 inches thick, the side-ground-planes and the vertical-ground-planes respectfully connect to encompass the first and second copper conductors, each of the side-ground-planes includes a pair of vias for connecting the two vertical-ground-planes, wherein the vias in each pair of vias are less than 0.1 inches apart.

2. The insulating casing of claim 1, wherein a first one of the two vertical-ground-planes is located above the first copper conductor and the second copper conductor.

3. The insulating casing of claim 1, wherein a second one of the two vertical-ground-planes attaches perpendicularly to the two side-ground-planes.

4. The insulating casing of claim 1, wherein a second one of the two vertical-ground-planes is located below the first copper conductor and the second copper conductor.

5. The insulating casing of claim 1, wherein at least one of the two side-ground-planes is parallel to at least one of the first copper conductor and the second copper conductor.

6. The insulating casing of claim 1, wherein a first one of the two vertical-ground-planes attaches perpendicularly to the two side-ground-planes.

7. The insulating casing of claim 1, wherein an inner surface of a first one of the two side-ground-planes is located to the left of the first copper conductor and the second copper conductor.

8. The insulating casing of claim 1, wherein an inner surface of a second one of the two side-ground-planes is located to the right of the second copper conductor and the first copper conductor.

* * * * *